United States Patent [19]

Vos

[11] 4,302,789
[45] Nov. 24, 1981

[54] DISC MEMORY HEAD ARM LIFT MECHANISM

[75] Inventor: Leroy A. Vos, St. Paul, Minn.

[73] Assignee: Magnetic Peripherals Inc., Minneapolis, Minn.

[21] Appl. No.: 119,685

[22] Filed: Feb. 8, 1980

[51] Int. Cl.³ .......................... G11B 21/22; G11B 5/54
[52] U.S. Cl. .................................................. 360/105
[58] Field of Search ........................ 360/105, 104, 103

[56] References Cited

U.S. PATENT DOCUMENTS 4,120,010 10/1978 Mitsuya et al. ..................... 360/105
4,206,489 6/1980 Manzke et al. ...................... 360/105
4,209,813 6/1980 Bryer ................................... 360/105

Primary Examiner—Robert S. Tupper
Attorney, Agent, or Firm—Edward L. Schwarz; Joseph A. Genovese

[57] ABSTRACT

A head arm to be mounted on the carriage of a disc memory drive has a two-stage lift mechanism. This reduces pitch of the head as it is lifted from and landed on the recording medium, reducing the danger that the head will penetrate the air film bearing and scuff the medium, a potential source of damage to either the head or medium.

9 Claims, 6 Drawing Figures

DISC MEMORY HEAD ARM LIFT MECHANISM

BACKGROUND OF THE INVENTION

In the computer industry, perhaps the most common type of mass storage device is the disc memory. Such a device includes usually a plurality of rotating discs, each side carrying an oxide recording surface on which are or can be recorded concentric data tracks. Cantilevered arms are attached to a moveable carriage adjacent the rotating disc, and whose position vis-a-vis the disc is electrically controllable. At the free ends of these arms are located transducing heads carried in sliders or pads which are shifted radially across the recording surface by movement of the carriage. Each pad itself is carried by a mounting which resiliently allows the pad to translate axially, pitch and roll relative to the data track motion as the recording surface changes axial position during rotation with respect to its datum due to unavoidable inaccuracies in its flatness and bearing mounting. The mounting is relatively stiff for other degrees of freedom. The head pads are designed to float on a very thin film of air adjacent the recording surfaces, thereby preventing any actual contact and potential damage inflicted on either the medium or the head by the other. A spring-loaded arm presses on each pad to force it toward the disc and hold it at the proper distance therefrom.

Further, it is desirable that the carriage be capable of retracting these pads past the periphery of the discs before stopping disc rotation, to prevent contact between them, and to permit replacement of the discs. Retracting is usually accomplished by means of a cam and a follower arrangement in which the pad loading arm carries either the cam or the follower, and lifts the head as it nears the edge of the disc during the retraction operation. When the carriage is moved radially inward from its retracted position, the cam and follower cooperate to land the pad on its recording surface.

It is at this point where problems now arise. Modern head pads are mounted in a very flexible gimbal spring which furnish little resistance to pitch and roll of the pad so as to allow it to more accurately follow the slight deviations in position of its recording disc. Thus, when the pad lands on the rotating disc, the pad's air bearing surface may not be perfectly parallel to the recording surface. Such a condition may permit a corner of the pad to penetrate the air film, causing each element to scuff and wear the other. In fact, particles may be scratched from either pad or disc which precipitate an avalanche-type failure where particles abraded from these elements build up faster than the filtering system can remove them.

Previously designed head unload mechanisms may employ 2 cam/follower units (U.S. Pat. No. 3,896,495). If the units are not precisely aligned with each other, the flying surface of the pad will pitch causing the problems just mentioned. Typical single cam lift mechanisms have their cams near a side of the head arm, so the followers can be stacked as a single unit. (U.S. Pat. Nos. 3,531,788; 3,579,213; 3,914,791; 3,786,457; and 3,713,121). Such off-center lifting practically guarantees an unpredictable amount of head pitch during lift and land.

There are some designs which avoid this problem. U.S. Pat. No. 3,984,873 teaches a centrally located cam actuated by a follower which operates independently of the head arm position. U.S. Pat. No. 4,017,898 discloses a centrally located lift arm actuated by a bar which moves vertically respective the disc surface. U.S. Pat. No. 4,120,010 shows a device employing a transversely (respective the head arm's long dimension) shiftable hairpin employing a two-stage camming operation to lift the head. '010 does not lift from the center of the head pad, however, and hence has the potential for rolling the head during lift and land.

BRIEF DESCRIPTION OF THE INVENTION

This improved head arm employs a two-stage mechanism, the first stage being a conventional side-actuated cam, to avoid these problems. A spring-loaded cantilever arm is employed in the conventional fashion to provide loading on the head and force it to fly at the proper distance from the medium. This load arm carries a primary lift bracket to aid in performing the load arm's second function. A lift arm is pivoted on each side of the head arm body and a first portion of it engages the primary lift bracket. A second portion of the lift arm functions as the cam follower which, when engaging the cam during retraction, causes the load arm to be shifted away from the medium. A secondary lift bracket is attached to the magnetic head pad and is adapted to engage the load arm as it is shifted away from the head pad causing the pad to be lifted from the medium. The contact point of the load arm with the secondary bracket during lifting or landing is precisely located to cause no pitch or roll of the head. The lift arm preferably comprises a bent piece of wire for lightness and strength.

Accordingly, one purpose of this invention is to provide a means for permitting certain types of non-retractable disc head arms to be lifted from and landed on the medium mechanically.

A second purpose of this invention is to prevent damage to the medium or the head caused by pitching and rolling of the head during its lifting and landing.

Another purpose of the invention is to permit such lifting and landing without appreciably adding to the sprung weight of the head arm.

Still another purpose is to prevent transmission of vibration from the lift arm to the head.

Other advantages and objects of this invention will be apparent from the following description.

DESCRIPTION OF THE PREFERRED EMBODIMENTS

Figure 1:
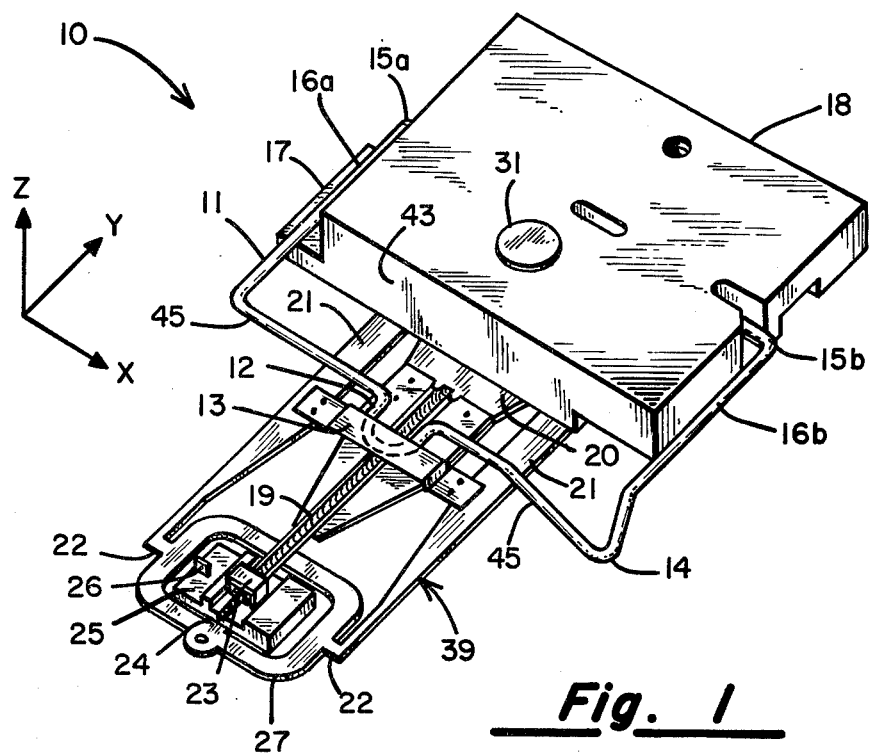
FIG. 1 is a top perspective view of a head arm employing the invention.
Figure 2:
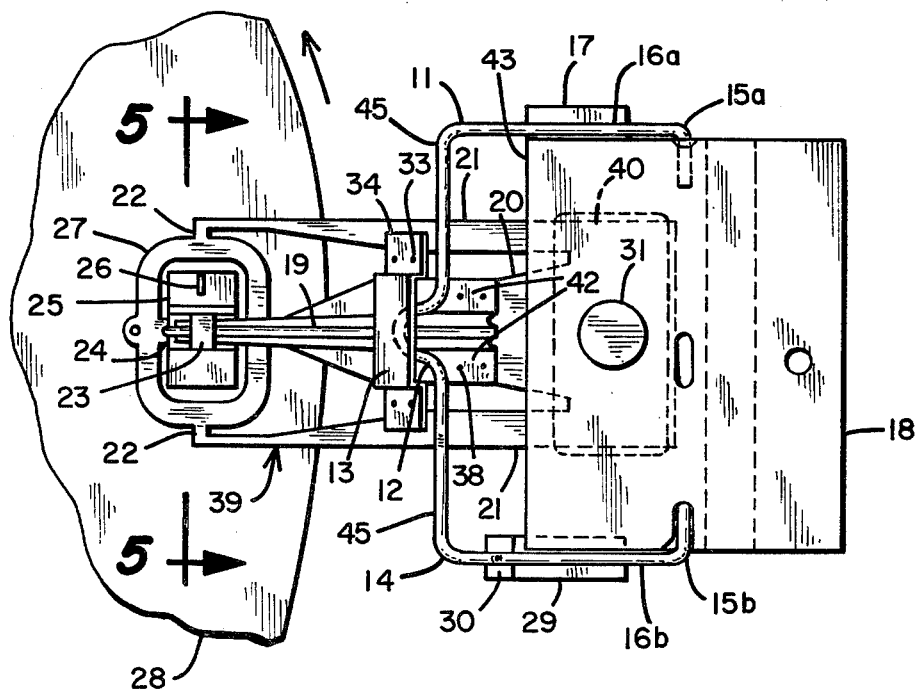
FIG. 2 is a top view of a head arm employing the improvements of this invention.
Figure 3:
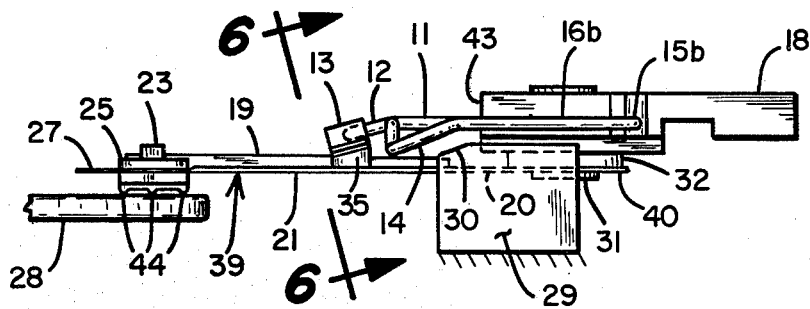
FIG. 3 is a side view of such a head arm with the arm in the extended position and the head riding on the medium.
Figure 4:
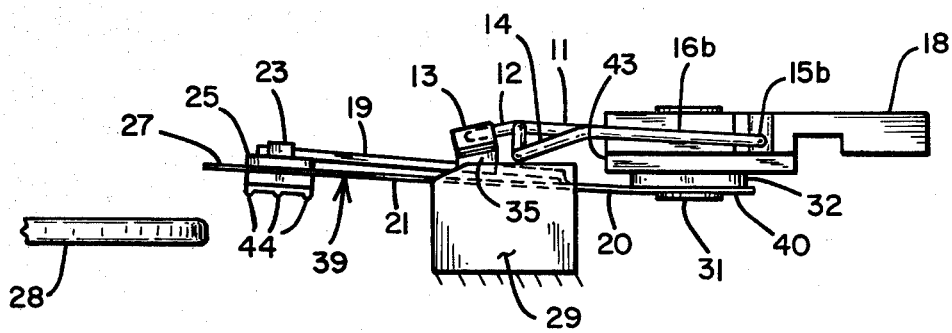
FIG. 4 is a side view of such a head arm in the retracted position with the improved lift mechanism supporting the head in its lifted and retracted position.
Figure 5:
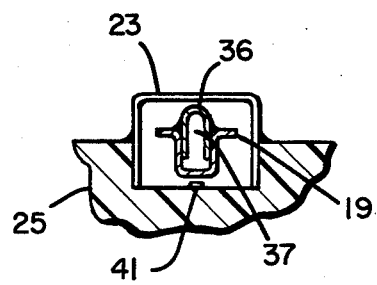
FIG. 5 is a cross section view of the interaction of the load arm with the head.

Referring first generally to FIGS. 1–4, the head arm of this invention comprises a body 18 which supports the remaining elements of the arm and is itself attached to the carriage of a disc drive during use. Head pad 25 has flying surfaces 44 which generate aerodynamic lift during operation. Head pad support element 39 comprises a unitary, thin, substantially flat, resilient piece of nonmagnetic metal incorporating head arms 21, load spring segment tongue 20, gimbal ring 27, pad attachment tabs 24, gimbal tabs 22 and attachment area 40. Attachment area 40 is spot welded to spacer 32, and both are securely riveted to body 18 by rivet 31. Arms 21 project from attachment area 40 perpendicularly to edge 43, and pass beneath load arm tabs 35 without touching or contacting them. Gimbal support tabs 22 are unitary with arms 21 and are also unitary with gimbal ring 27, which they support. Head support tab 24 is unitary with gimbal 27 and provide an area to which head pad or slider 25 can be attached, preferably by adhesive. A similar tab, hidden by load arm 19, supports the other side of pad 25. Pad 25 carries head 26 in a position placing the head's transducing surface coplanar with the pad's flying surface. Load arm 19 provides the force on the back of pad 25 opposing the aerodynamic force between the rotating disc 28, only a segment of which is shown in FIGS. 2-4, and pad 25. The force placed on pad 25 by arm 19 is provided by spring segment or tongue 20 of element 39. Arm 19 is unitary with flanges 42 by which it is attached with spot welds 38 to load spring tongue 20. No significant forces are imposed on arm 19 other then that provided by pad 25 and load spring tongue 20. Tongue 20 may well require a predetermined bend downward (as viewed in FIGS. 3 and 4) to properly load pad 25 during operation. Referring to FIG. 5, the pad 25 loading force is transferred from arm 19 via a load button 41, positioned so as to ensure the proper location of the loading force vis-a-vis the lift generated by pad 25 during rotation of disc 28. Load arm 19 itself must be very rigid, and in my preferred embodiment is bent into a channel-shaped cross section (see FIG. 5) to provide the needed stiffness.

In operation, when pad 25 is landed on a rotating disc 28, load spring tongue 20 provides force to arm 19 which is transferred through load button 41 to press pad 25 toward disc 28 in opposition to the aerodynamic lift generated by relative movement between them. Arms 21 are very resilient in the axial (relative to disc 28) direction, but relatively stiff in the tangential and radial directions relative thereto. Thus pad 25 can easily compensate for slight wobble of disc 28 during rotation, and avoid direct contact between pad 25 and disc 28. The flexibility of arms 21, in conjunction with the flexibility of connectors 22, tabs 24, and gimbal ring 27, allow pitch and roll of pad 25, providing for further adapting of the pad's position relative to the continual slight shifting of disc 28.

The aspects of this device which I consider novel involve the means by which pad 25 is lifted from disc 28 while the carriage is retracting and which lower pad 25, when extending the carriage, into transducing position. As explained earlier, the key is a two-stage lifting operation for pad 25. A preferred means of implementing this concept includes a lift arm or member 11. Lift arm 11 comprises a pair of stub shafts 15a and and 15b, pivot arms 16a and 16b, an actuation area comprising a cam follower 14, and a projection 12 carried between the brace portions 45 which join the pivot arms. In my preferred embodiment, a single piece of small diameter, relatively stiff wire is bent into the shape shown to form lift arm 11. The two ends of the wire are bent into stub shafts 15a and 15b. The segment 16b of lift arm 11 adjacent stub shaft 15b is bent down to form a cam follower type actuation area 14. The wire is further bent to form a projection comprising half loop 12 which actually transfers the lifting force to arm 19. The remaining end of the wire is bent into a second pivot arm 16a having at its very end second stub shaft 15a, coaxial with and facing stub shaft 15b. Body 18 further includes a ledge 17 to support pivot arm 16a in a position preventing lift arm 11 from interfering with the operation of load arm 19 with pad 25, but permitting transfer of lifting force to load arm 19 during retraction and extension of the assembly.

Figure 6:
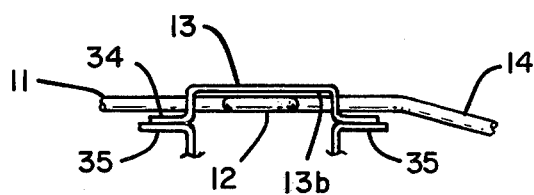
FIG. 6 is a cross section view showing the spacial relationship between the lift arm and the bracket with which it makes contact when lifting the head.

Bracket 13 is attached to projecting tabs 35 (FIG. 6) of load arm 19, preferably with spot welds. On the inside of bracket 13 immediately adjacent half loop 12 is a lifting surface 13a which half loop 12 contacts to transmit the lifting force to arm 19. A similar but somewhat smaller bracket 23 is attached to pad 25 and encloses the end of load arm 19 adjacent pad 25. Lift arm 11 is pivoted up and down by cam 29 as assembly 10 is extended and retracted (FIGS. 3 and 4). The actual lifting is performed by angled cam area 30 interacting with cam follower 14. Ledge 17 supports lift arm 11 in a position between lifting surface 13a and load arm 19 while assembly 18 is extended and pad 25 is riding on disc 28. Also note that in this preferred embodiment with relatively stiff wire comprising lift arm 11, lifting of arm 19 will take place in a very predicable way in that no alignment of cams on each side of assembly 10 governs the motion of arm 19.

A striker 36 is attached to the end of lift arm 19, facing the top and inside of bracket 23. A totally enclosed area 37 so formed in a convenient point for the wires from head 26 to enter the channel of arm 19. As lift arm 11 lifts arm 19, bending load spring tongue 20, striker 36 (FIG. 5) contacts the inside area of bracket 23 and pad 25 is lifted up from the surface of disc 28, as is shown in FIG. 4. The contact point between bracket 23 and striker 36 must be carefully selected so that no roll or pitch of pad 25 occurs during lifting and lowering of pad 25 relative to disc 28. I have found that by designing striker 36 to be quite short (e.g., 0.040 in. along the long axis of arm 19) and positioned to contact bracket 23 in alignment with tabs 22 will in practice allow pad 25 to be lifted and dropped in the precisely correct attitude. It is essential for proper operation during lifting and landing that arm 19 not contact the sides of bracket 23. The resulting frictional hysteresis will drastically affect the roll and pitch of pad 25 during lifting and dropping and will almost certainly cause crashes.

The preceding description furnishes the basis for the claims which follow.

What I claim is:

1. A head arm of the type to be attached to the carriage of a disc memory at one end, and supporting a transducing head pad having a flying surface at the other end thereof, comprising in combination
    (a) a rigid body adapted to mate with the disc memory carriage, and having an edge;
    (b) a pad support having a pair of relatively long dimensions and a relatively thin dimension transverse to the long dimensions, said support resiliently flexible about axes parallel to the long dimensions and relatively resistant to bending about axes parallel to the thin dimension, said support attached in cantilever fashion to, and having one long dimension extending past the body's edge and generally perpendicular thereto, said support carrying the pad at its free end with the plane of the pad's flying surface generally parallel to the support's long dimensions;

(c) a relatively rigid load arm having first and second ends;

(d) means for supporting the load arm at a first end adjacent the body in a position placing the load arm's second end adjacent the side of the pad opposite the flying surface, said load arm supporting means including resilient bias means forcing the load arm's second end toward the pad with predetermined force;

(e) a bracket attached to the pad and encircling the load arm adjacent its second end;

(f) a lifting surface carried on the load arm intermediate its ends; and (g) lifting means pivotably attached to the body and including an actuation area, for pivoting into engagement with the lifting surface on the load arm and shifting the load arm in opposition to the bias produced thereon by the bias means, when force is applied to the actuation area to rotate the lifting means through at least a preselected angle.

2. The arm of claim 1, wherein the lifting means comprises a lift member pivotably attached to at least one side of the body and extending into engagement with the load arm's lifting surface, and wherein said actuation area comprises a cam follower surface on the lift member.

3. The arm of claim 2, wherein the lift member comprises a pair of pivot arms each carrying adjacent a first end a stub shaft coaxial with and facing the other stub shaft, said stub shafts journaled in coaxial holes on opposite sides of the body adjacent the edge, and a brace rigidly connected between the second ends of the arms and in engagement with the load arm's lifting surface.

4. The arm of claim 3, wherein the pivot arms, stub shafts and brace of the lift member comprises a single wire bent into an approximate U shape, with the stub shafts comprising the wire's ends bent inward and coaxially facing each other.

5. The arm of claim 4, wherein the portion of the wire serving as the brace includes a central portion bent into a half loop projecting away from the stub shafts, said half loop engaging the load arm's lifting surface.

6. The arm of claim 5, wherein the lifting surface is carried on a bracket encircling the half loop.

7. The arms of claim 4, wherein the lifting surface is carried on a bracket at least partially encircling the brace portion of the wire.

8. The arm of claim 3, wherein the lift member's brace includes a projection extending away from the stub shafts and engaging the load arm's lifting surface.

9. The arm of claim 8, wherein the load arm includes a bracket carrying the lifting surface and at least partially encircling the projection on the brace.

* * * * *